P. FLEURY & H. MORIN.
DRIVING MECHANISM FOR AUTOMOBILES.
APPLICATION FILED JULY 22, 1913.

1,175,251.

Patented Mar. 14, 1916.
2 SHEETS—SHEET 1.

Witnesses
Sue M. Kerstein
Cora W. Tracy

Inventors
Paul Fleury & Henri Morin
by Max Georgii
Attorney

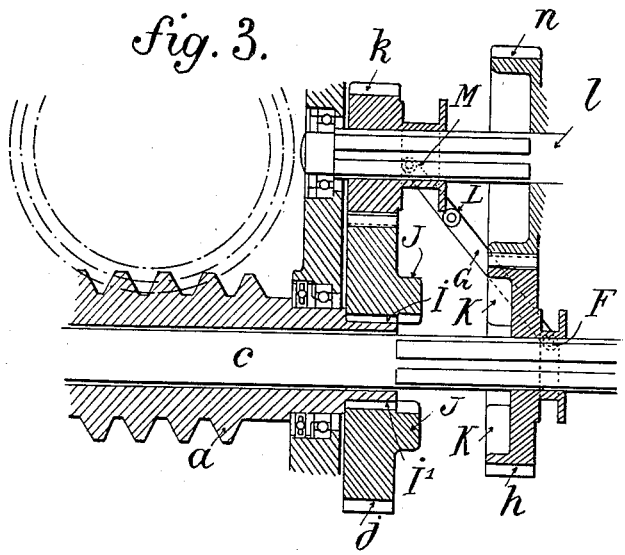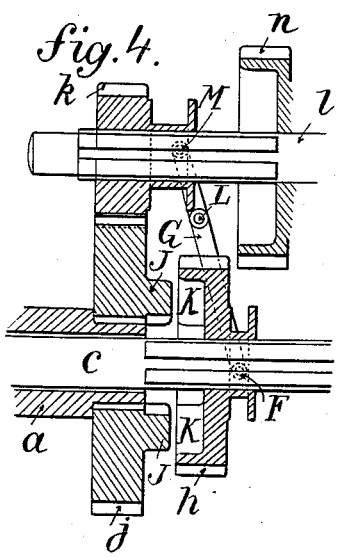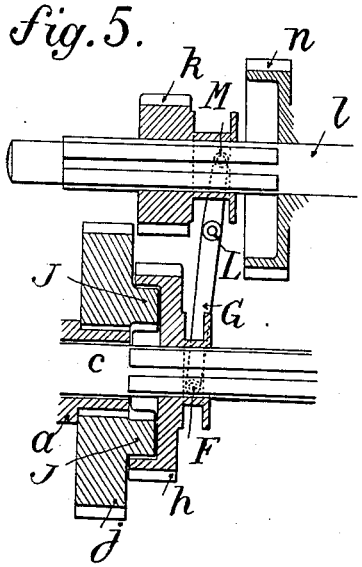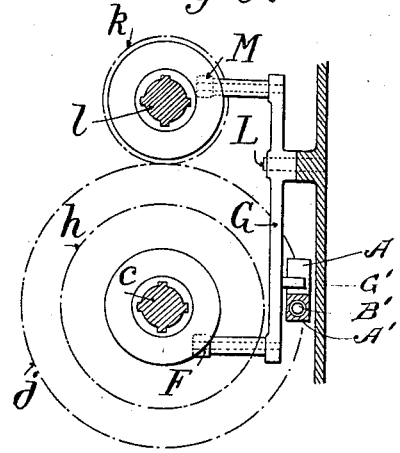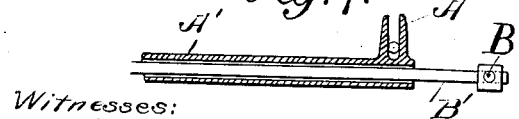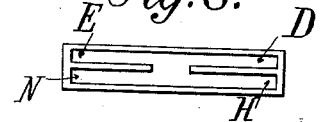

UNITED STATES PATENT OFFICE.

PAUL FLEURY AND HENRI MORIN, OF SURESNES, FRANCE.

DRIVING MECHANISM FOR AUTOMOBILES.

1,175,251.　　　Specification of Letters Patent.　　Patented Mar. 14, 1916.

Application filed July 22, 1913. Serial No. 780,467.

*To all whom it may concern:*

Be it known that we, PAUL FLEURY and HENRI MORIN, commonly called GAUTHIER, citizens of the Republic of France, both residing at Suresnes, Seine, France, have invented a new and useful Improvement in Driving Mechanism for Automobiles, which improvement is fully set forth in the following specification.

In automobiles as heretofore constructed the chassis carries the various mechanical parts such as the engine, change speed gearing and differential gearing which are independent of each other, and as these different parts should be in well determined positions both in height and with respect to the longitudinal axis of the chassis costly mounting and complicated adjustments are necessary. Moreover even when the work is performed perfectly, these parts do not preserve their relative positions when running because of the deformation of the chassis caused by the road. In order to obviate this and in order that the deformations of the chassis may not interfere with the parts of the vehicle, the change speed gear box according to this invention is rendered completely independent of the chassis by combining it with the differential casing on the rear axle, a substantially unitary housing for the change speed mechanism and the differential gearing being thus provided. The driving shaft proceeding directly from the clutch cone passes through the member which drives the differential gearing on the back axle and then goes to the change speed gearing, which latter is placed in the rear of the axle instead of being located as usual between the engine and the back axle. The mounting of the change speed mechanism is thus substantially rigid with the mounting of the differential gearing on the driven axle. This arrangement insures much more perfect balancing of the parts.

The accompanying drawing illustrates one method of carrying out the invention.

Figure 1:
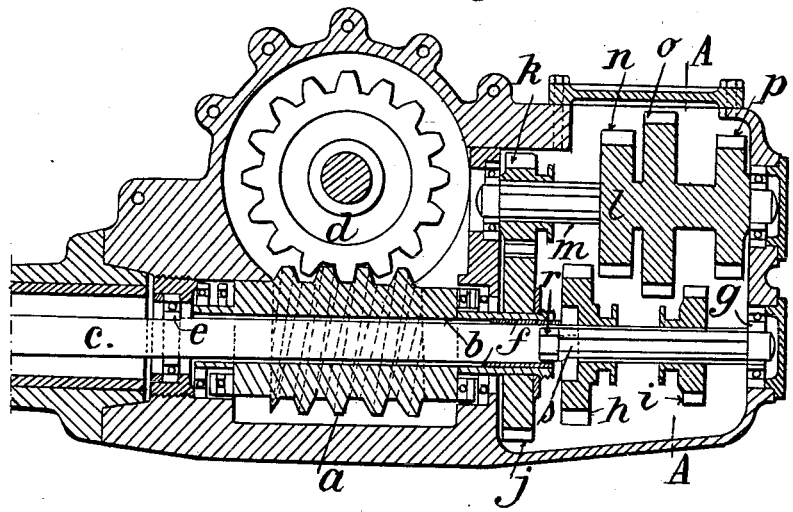
Figure 2:
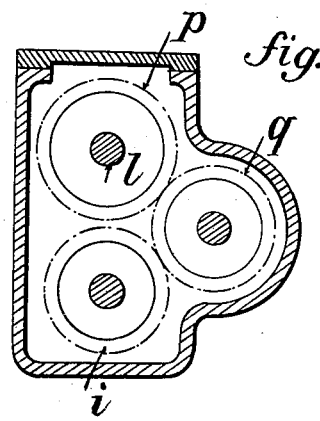

In the drawing Figure 1 is a longitudinal section; Fig. 2 is a transverse section on the line A—A of Fig. 1; Figs. 3 to 5 are sectional views, illustrating the positions of the gears for different speeds; Fig. 6 is an end view, partly in section, of the structure of Fig. 5, showing certain additional details; Fig. 7 is a detailed view of the rods controlling the shifting pinions; and Fig. 8 is a plan of the sector for the controlling lever.

$a$ is a hollow driving or transmission member of any known type such as a worm sleeve for example, supported at its ends by bearings in the differential casing and allowing free passage through its bore $b$ to a driving shaft $c$ leading from the clutch. Such shaft $c$ which is connected to the clutch by a flexible joint, therefore passes first through the transmission member $a$ which drives the corresponding part $d$ of the differential gearing mounted in the differential casing and then passes to the change speed gearing or mechanism at the rear of the axle, the shaft $c$ being supported in bearings $e, f, g$.

The driving shaft $c$ carries toward its free end keys which serve to drive the gear wheels $h$ and $i$ and these under the action of levers not shown in the drawing can move along the shaft. On the other hand the gear wheel $j$ fast with the transmitting member $a$ is in mesh with the smaller gear wheel $k$ which is mounted upon the intermediate shaft $l$ and is capable of sliding upon feathers $m$ so that it can come out of mesh with the gear wheel $j$. The intermediate shaft $l$ has fast with it the gear wheels $n\ o\ p$. The wheel $h$ on the shaft $c$ can be moved into mesh with the wheel $n$; and the pinion $i$ on said shaft can be moved into mesh with the wheel $o$. Lastly an intermediate pinion $q$ always in mesh with the gear wheel $p$ meshes with the pinion $i$ when this latter pinion is pushed toward the end of the shaft $c$. The sliding gear wheel $k$ except for top speed is always in mesh with the gear wheel $j$. In such arrangement the different drives are obtained in the following manner:

1. *Rear drive:*—The controlling lever is moved to bring it into the position D in the sector (Fig. 8), the rod B' being thereby moved so that its fork B secured thereto moves pinion $i$ toward the rear. The pinion then meshes with the wheel $q$, and thereupon drives the gear wheel $p$ in the reverse direction of rotation, the shaft $l$ thereby actuating the transmission member $a$ through the gear wheels $k$ and $j$.

2. *First or slow speed:*—By means of the rod $b'$, the pinion $i$ is moved forward into mesh with the wheel $o$, which thereupon operates through gears $k$ and $j$ and transmission member *a* to produce slow forward motion of the vehicle. For this speed the controlling lever is placed at E in the sector (Fig. 8).

3. *Second or intermediate speed*:—For this speed, the pinion *i* is held in neutral, that is, out of mesh. By suitably moving the whole controlling rod A', its attached fork A engages the pin G' on one arm of lever G, moving said lever, so that its projecting finger F shifts pinion *h* into mesh with gear wheel *n*, the parts being then in the position shown in Fig. 3. It is to be noted that the upper arm of lever G, which is pivoted at L, maintains the gear wheel *k* still in mesh with the gear wheel *j*, which latter is solid with or keyed to the transmission member *a*, as at I, I'. Movement is thus transmitted from the shaft, through the agency of gears *h* and *n*, shaft *c*, gears *k*, *j*, and transmission member *a*, to the differential gearing on the vehicle axle. For this speed, the controlling lever is placed at H in the sector.

4. *Third or high speed*:—This speed is obtained by direct drive. To effect this, the controlling lever is shifted to N, whereby the rod A' through its fork A acts on lever G, first to disengage pinion *h* from *n*, as shown in Fig. 4; and then by a further movement of lever G, to shift pinion *h* until its clutch teeth K engage complementary clutch teeth J on member *j*, while at the same time the roller M at the inner end of lever J acts on shiftable gear *k* to move the same toward the right and out of engagement with gear *j*. At the end of this movement, the parts are in the position shown in Fig. 5. The driving shaft *c* is now directly connected through the clutch arrangement *h*, *j*, to the transmission member *a*. With the parts operating under these conditions, the counter-shaft *l* does not rotate.

The transmission member *a* may be a worm of any suitable type or any other suitable member actuating the differential gearing. This transmission member is independent of the invention which has for its object the special combination of the differential casing with the change speed gearing.

Claims:

1. A transmission gearing comprising a driving shaft, a driven element in the form of a sleeve mounted on the shaft and having a worm between its ends, change speed gearing between the shaft and sleeve, and driven mechanism comprising an axle having a worm gear thereon meshing with the worm, in combination with a casing having bearings at opposite ends of the sleeve, the shaft projecting beyond one of the bearings and parts of the change speed gearing being mounted on the projecting portion of the shaft.

2. A transmission gearing comprising a casing formed with bearings in opposing walls thereof and with an intermediate bearing between said walls, a driven element journaled in the intermediate bearing and in the bearing in one of the opposing walls, a driving shaft extending through the driven element and journaled in the bearing in the other of said opposing walls, the driven element being in the form of a sleeve and having a worm between the bearings in which it is journaled, an axle extending transversely through the casing and having a worm gear thereon meshing with the worm, and change speed gearing between the shaft and the sleeve.

3. A transmission gearing comprising a casing having bearings in opposing walls thereof, and an intermediate bearing, driving and driven elements, the driven element being mounted on the driving element, and one of said elements being journaled in the bearing of one of said opposing walls, and one of said elements being journaled in the bearing of the other of said opposing walls, and the driven element being journaled in the intermediate bearing, the driven element including a sleeve having a worm between the bearings thereof, a worm gear coacting with the worm and located on one side of the intermediate bearing, the worm gearing being supported by the casing and change speed gearing between the driving and driven elements located on the other side of the intermediate bearing.

In testimony whereof we have signed this specification in the presence of two subscribing witnesses.

PAUL FLEURY.
HENRI MORIN.

Witnesses:
 HANSON C. COXE,
 GASTON BRUNDAY.